US006226426B1

(12) United States Patent
Magne et al.

(10) Patent No.: US 6,226,426 B1
(45) Date of Patent: May 1, 2001

(54) DEVICE FOR DEMULTIPLEXING LIGHT PATHS CONTAINED IN AN OPTICAL SPECTRUM

(75) Inventors: Sylvain Magne, Chatillon; Pierre Ferdinand, Houilles; Gilles Grand, Grenoble, all of (FR)

(73) Assignee: Commissariat A L'Energie Atomique, Paris (FR)

( * ) Notice: Subject to any disclaimer, the term of this patent is extended or adjusted under 35 U.S.C. 154(b) by 0 days.

(21) Appl. No.: 09/380,346
(22) PCT Filed: Mar. 20, 1998
(86) PCT No.: PCT/FR98/00563
§ 371 Date: Nov. 18, 1999
§ 102(e) Date: Nov. 18, 1999
(87) PCT Pub. No.: WO98/43119
PCT Pub. Date: Oct. 1, 1998

(30) Foreign Application Priority Data

Mar. 20, 1997 (FR) .................................................. 97 03424

(51) Int. Cl.$^7$ ....................................................... G02B 6/10
(52) U.S. Cl. .................. 385/24; 385/45; 385/37; 385/14
(58) Field of Search ........................ 385/45, 24, 37, 385/14

(56) References Cited

U.S. PATENT DOCUMENTS

| 4,786,133 | 11/1988 | Gidon et al. . |
| 4,790,614 | 12/1988 | Imoto et al. . |
| 4,996,419 | 2/1991 | Morey . |
| 5,191,458 | 3/1993 | Lyons et al. . |
| 5,426,297 | 6/1995 | Dunphy et al. . |
| 5,457,760 | 10/1995 | Mizrahi . |
| 5,802,222 | * 9/1998 | Rasch et al. ............................ 385/14 |
| 5,818,986 | * 10/1998 | Asawa et al. ........................... 385/24 |
| 5,832,155 | * 11/1998 | Rasch et al. ............................ 385/48 |

FOREIGN PATENT DOCUMENTS

| 0 275 795 | 7/1988 | (EP) . |
| 0 388 079 | 10/1989 | (EP) . |
| 572 169 A1 | 12/1993 | (EP) . |
| WO 96/31756 | 10/1996 | (WO) . |
| WO96/36895 | 11/1996 | (WO) . |
| WO97/08574 | 3/1997 | (WO) . |

OTHER PUBLICATIONS

Pierre Ferdinand, et al., "Mine operating Accurate Stability Control with Optical Fiber Sensing and Bragg Grating Technology: The European Brite/Euram Stabilos Project", Journal of Lightwave Technology, vol. 13, No. 7, Jul. 1995, pp. 1303–1313.

P. C. Clemens, et al., "8–Channel Optical Demultiplexer Realized as $Sio_2$/Si Flat–Field Spectrograph", IEEE Photonics Technology Letters, vol. 6, No. 9 Sep. 1994, pp. 1109–1111.

B. H. Verbeek, et al., "Integrated Four–Channel Mach–Zehnder Multi/Demultiplexer Fabricated with Phosphorous Doped $SiO_2$ Waveguides on Si", Journal of Lightwave Technology, vol. 6, No. 6, Jun. 1988, pp. 1011–1015.

(List continued on next page.)

*Primary Examiner*—Hung N. Ngo
(74) *Attorney, Agent, or Firm*—Pearne & Gordon LLP

(57) ABSTRACT

The present invention relates to a device for demultiplexing spectrum lines contained in an optical spectrum. This device comprises a energy separator (2a, 2b, 2c) and selective wavelength light reflectors (12), each selective wavelength light reflector having a wavelength bandpass that contains the spectral region associated with one of the lines and that, therefore, reflects only this particular line. Applications to surveying constructions, such as buildings and aircraft.

12 Claims, 3 Drawing Sheets

OTHER PUBLICATIONS

Hiroshi Takahashi, et al., "Transmission Characteristics of Arrayed Waveguide N x N Wavelength Multiplexer", Journal of Lightwave Technology, vol. 13, No. 3, Mar. 1995, pp. 447–455.

K. Okamoto, et al., "Fabrication of 64 x 64 arrayed--weaveguide grating multiplexer on silicon", Electronics Letters, 2nd Feb. 1995, vol. 31, No. 3, pp. 184–186.

Ludwig Ross, "Review Paper, Integrated optical components in substrate glasses[1])", Glastech. Ber. 62 (1989) Nr. 8, pp. 285–297.

S. Valette, et al., "Si–Based Integrated Optics Technologies", Solid State Technology/Feb. 1999, pp. 68–74.

S. Valette, et al., "Silicon–based Integrated Optics Technology for Optical Sensor Applications*", Sensors and Actuators, A21 A23 (1990) 1087–1091, pp. 1087–1091.

"New method for low cost and efficient optical connections between singlemode fibres and silica guides", Electronics letters 3rd Jan. 1991, vol. 27, No. 1, pp. 16–18.

Masayuki Izutsu, "Operation mechanism of single–mode optical–waveguide Y junction", Optics Letters, vol. 7., No. 3, Mar. 1982, pp. 136–138.

C.J. Rowe, "High–reflectivity surface–relief gratings in single–mode optical fibres", IEE Proceedings, vol. 134, Pt. J., No. 3, Jun. 1987, pp. 197–202.

"UV written 1.5 um reflection filters, in single mode planar silica guides", Electronics Letters, vol. 28 No. 22, Oct. 22, 1992, pp. 2106–2107.

F. Bilodeau, et al., "Photosensitization of optical fiber and silica–on–silicon/silica waveguides", Optics Letters, vol., 18, No. 12, Jun. 15, 1993, pp. 953–955.

K.O. Hill, et al., "Bragg gratings fabricated in monomode photosensitive optical fiber by UV exposure through a phase mask", Appl. Phys. Lett. 62 (10), Mar. 8, 1993, pp. 1035–1037.

R. Kashyap, et al., "Novel method of producing all fibre photoinduced chirped gratings", Electronics Letters Online No: 19940669, Apr. 18, 1994, 2 pages.

M. C. Farries, "Very broad reflection bandwidth (44nm) chirped fibre gratings and narrow bandpass filters produced by the use of an amplitude mask", Electronics Letters Online No: 19940609, May 3, 1994, 2 Pages.

G. Meltz, et al., "Formation of Bragg gratings in optical fibers by a transverse holographic method", Optics Letters, vol. 14, No. 15, Aug. 1, 1989, pp. 823–825.

R. Kashyap, et al., "Laser–Trimmed Four–Port Bandpass Filter Fabricated in Single–Mode Photosensitive Ge–Doped Planar Waveguide", pp. 191–194. 1993.

Ingolf Baumann, et al., "Compact All–Fiber Add–Drop–Mulitplexer Using Fiber Bragg Gratings", IEEE Photonics Technology Letters, No. 8, No. 10, Oct. 1996, pp. 1331–1333.

William B. Spillman, Jr., "Sensing and Processing for Smart Structures", Proceedings of the IEEE, vol. 84, No. 1, Jan. 1996, pp. 68–77.

A.B. Lobo Ribeiro, et al., "Time–and–spatial–multiplexing tree topology for fiber–optic Bragg–grating sensors with interferometric wavelength–shift detection", Applied Optics, vol. 35, No. 13, May 1, 1996, pp. 2267–2273.

Electronics Letters, Oct. 22, 1992, vol. 28, No. 22, pp. 2106–2107.

* cited by examiner

DEVICE FOR DEMULTIPLEXING LIGHT PATHS CONTAINED IN AN OPTICAL SPECTRUM

FIELD OF THE INVENTION

The present invention relates to a device for demultiplexing spectrum lines contained in an optical spectrum.

The device can be used for applications in the field of optical telecommunications.

The invention can be particularly used for applications in optical fiber sensor networks.

Reference will be made to documents (1) to (4) which, as for the other documents referred to below, are listed at the end of the present description.

Sensor networks of this type are used to survey constructions in the following fields: building, public works, transport, aeronautics and the aerospace industry.

BACKGROUND ART

Four techniques are known for creating demultiplexing in integrated optics: the first technique uses an etched grating, the second uses Mach-Zehnder interferometers, the third uses a phase or PHASAR network (i.e. PHASe-Aray) and the fourth uses balanced Mach-Zehnder interferometers or 100% couplers with identically photo-etched Bragg gratings on the two arms ("ADD-DROP multiplexer").

The first technique uses light diffraction with a concave grating with a circular or flat output field that is etched and blazed to a high level.

Vertical etching is possible when silica guides are on silicon and may reach a depth of 25 $\mu$m.

Document (6) may be referred to for further information about this subject.

The demultiplexer component then consists of an input fiber connected to a planar guide that sends the light in the direction of an etched diffraction grating.

In the example of a circular output field grating, the incident ray and the diffracted light that are refocused at various angles of incidence, are localized on the Rowland circle.

In the example of a flat field grating (see document (6)), the stigmatic points dispersed in wavelengths are aligned at an orthogonal right angle to the reflected beam.

Given that the grating operates using reflection, it is metal-coated.

The shape of the grating etching can be constituted by a number of ellipses, as shown in document (7).

The diffracted beam is refocused on single-mode guides, for example with a mode diameter of 9 $\mu$m and a spacing of 16 $\mu$m as shown in document (6), or on photodiodes that create a strip, as shown in document (5).

The grating preferably operates at a high order of diffraction, ranging from 4 in document (6) to 50 in document (5), to achieve high density demultiplexing for telecommunications.

The second technique is based on using several Mach-Zehnder or similar interferometers in series. These interferometers are all unbalanced in terms of their optical paths with a characteristic imbalanced value.

Document (8) may be consulted for further information about this subject.

For a four-channel demultiplexer two interferometers are used, for example, the imbalances of which are respectively $\Delta L_1$ and $\Delta L_2 = \Delta L_1 + \lambda/4N$, and a third interferometer the imbalance $\Delta L_3$ of which is equal to 2.$\Delta L_1$ (usually of the order of between 50 $\mu$m and 100 $\mu$m) in order to obtain a separation between the channels of between 7.5 nm to 1,550 nm, N being the effective index of the mode.

The third technique uses an optical phase-array grating that comprises a number of parallel single-mode phase shifter guides that connect two flat input and output guides with circular interfaces.

Document (9) may be consulted for further information about this subject.

The input and output guides are connected to the other circular interfaces of the flat guides.

The light injected by any of the input guides is dispersed in the flat input guide and covers all the phase shifter guides located at the interface.

There is a constant difference in length between one phase shifter guide and another such that the beams of light leaving the outlet of the flat guide interfere as though they were reflected by a concave sloped diffraction grating.

The shift in the optical path induced by the phase shifter guides produces the same effect as a slope in the leading edge of the wave relative to the interface.

The PHASAR, which operates by transmission, therefore behaves like a concave diffraction grating of a very high order (approximately 50 to 100) and of a high multiplexing capacity.

Document (10) may be consulted for further information about this subject.

Better spectrum definition is achieved using a greater number of phase shifter guides.

In document (11), for example, 60 phase shifter guides are used.

A half-wave plate can be inserted in the center of the optical circuit constituted by the phase shifter guides in order to eliminate the dependence of the circuit on polarization.

The fourth technique uses balanced Mach-Zehnder interferometers or 100% couplers with Bragg gratings identically photo-etched on the two arms. For all the distinct wavelengths of the Bragg wavelength the light is injected at port 1 and is emitted at port 3 (100% coupling); the Bragg wavelength light is selectively reflected at port 2. Document (29), from where the number references above are taken, may be consulted for further information about this subject.

Three types of material are used to produce the components that are used in the four techniques above: glass, silica on silicon and InP or similar semi-conductors.

In particular, etched gratings and PHASARs have been produced using integrated optics on silicon whereas demultiplexers with interferometers have been made using integrated optics on silicon or glass.

None of these known techniques enable the Bragg wavelengths to be directly determined with satisfactory accuracy.

Also, these techniques require a compromise to be made between cross talk and occupied spectrum space.

Cross talk, i.e. the coupling of light between the outputs, should be minimized because it leads to the wavelengths being inaccurately measured.

Typically, −25 dB to −30 dB cross talk is preferred and the spectrum occupation is consequently deduced.

When a diffraction grating uses integrated optics on silicon the light coupling between the outputs is induced by the diffusion in the guide, due to the etching imperfections, and by the coupling between the output guides when they are too close together.

The cross talk is generally of the order of between −20 dB and −35 dB between the centers of two adjacent spectrum channels whereas it only ranges between −10 dB and −15 dB at the intersection of the transfer operations of these channels, at the mid-point of the spectrum period.

PHASARs produce some of the best cross talk and occupied spectrum space characteristics.

Generally, cross talk better than −30 dB is achieved in document (11) where the spectrum occupation is 0.8 nm and the period is 2 nm, using 60 phase shifter guides, and where the order of diffraction is 60.

In Mach-Zehnder interferometers, the cross talk is dependent on the accuracy of the setting of the 3 dB separation couplers.

As an example, document (8) describes a demultiplexer that is constituted by three interferometers comprising 3.1 dB couplers, instead of 3 dB couplers, and that is characterized by approximately −20 dB cross talk.

Document (4) also describes a demultiplexer that includes a collimation device for the light to be analyzed and a series of bandpass filters that are assembled in cascade and associated with photodetectors.

The main drawback with this demultiplexer is that it is designed to operate in an open space.

This results in the reproducibility and the reliability of the measurements, as well as the robustness and the integration of this demultiplexer, being insufficient for use in microsystem applications.

Furthermore, the minimal cross talk that it is possible to obtain with this demultiplexer is dependent on the reflection of the bandpass filters used, that typically comprise −20 dB anti-reflection deposits, and is also highly dependent on the polarization of the light analyzed (the filters are at a 45° angle).

Finally, this type of demultiplexer is not suitable to be industrially produced to meet the requirements of the industrial sensor market.

DISCLOSURE OF THE INVENTION

The aim of the present invention is to overcome the above drawbacks by providing a demultiplexing device that has excellent wavelength rejection, ensures very reduced cross talk (lower than −30 dB) and that is flexible in terms of production as it enables the matched wavelengths to be adjusted. U.S. Pat. No. 5,457,760 discloses a wavelength demultiplexing device according to the preamble of claim 1.

More precisely, the present invention relates to a wavelength demultiplexing device with for a plurality N of spectrum lines that together constitute an optical spectrum and that are each capable of fluctuating in a determined spectral region, comprising;

an energy separator having an input that is designed to receive the optical spectrum and a plurality N of outputs that are each adapted to provide a respective fraction of the optical spectrum light energy, and a plurality N of optical wavelength filters each one of which is connected to a particular output of the energy separator and has a wavelength bandpass that contains the spectral region associated with one of these lines of the optical spectrum and that, therefore, only filters this particular line, each filter being designed to filter a different line, this device being characterized in that each of the optical filters (12) is constituted by a unique wavelength selective light reflector that is adapted to reflect a single line of the optical spectrum that is different for each selective reflector, and in that each of these selective reflectors is associated with means to direct the thus reflected line in a different direction to that taken by the incident light on the selective reflector.

A known type of energy separator can be used, such as those marketed by the Corning company. The energy separator can be an assembly of separator junctions assembled in cascade, i.e. in a tree shape, assembly being tree-structured.

Each separator junction can be multi-mode but they are preferably single-mode, particularly when the optical spectrum, which has to be demultiplexed, is transported by an optical fiber connected to the input of the separator junction assembly.

These separator junctions can be couplers, for example 3 dB couplers, such that both of the output channels transport half of the incident ray power.

However, in order for this to be possible the coupling length and the space between the two coupled guides of such, couplers must be accurately adjusted according to wavelength.

It is for this reason that, in the present invention, it is preferable to use separator junctions that are constituted by Y junctions.

These Y junctions have the advantage of being achromatic and independent of the polarization.

According to one preferred embodiment of the device of the invention the means associated with each selective reflector is constituted by an optical waveguide that is intended to propagate the line reflected by said reflector.

According to one preferred embodiment of the device of the invention the energy separator and the selective reflectors are integrated in the same substrate.

The substrate can be glass or silicon.

Preferably, the selective reflectors comprise Bragg gratings.

The Bragg gratings can be photo-induced or photo-etched.

Furthermore, the Bragg gratings can be chirped gratings.

Fixed period gratings with maximum reflectivity can also be used. These are obtained, for example, using photo-writing under very strong flux in order to widen the spectral response.

BRIEF DESCRIPTION OF THE DRAWINGS

The present invention will be better understood from the following detailed description. The description is of a non-limitative example and refers to the attached figures where.

DETAILED DISCLOSURE OF PARTICULAR EMBODIMENTS

Figure 1:
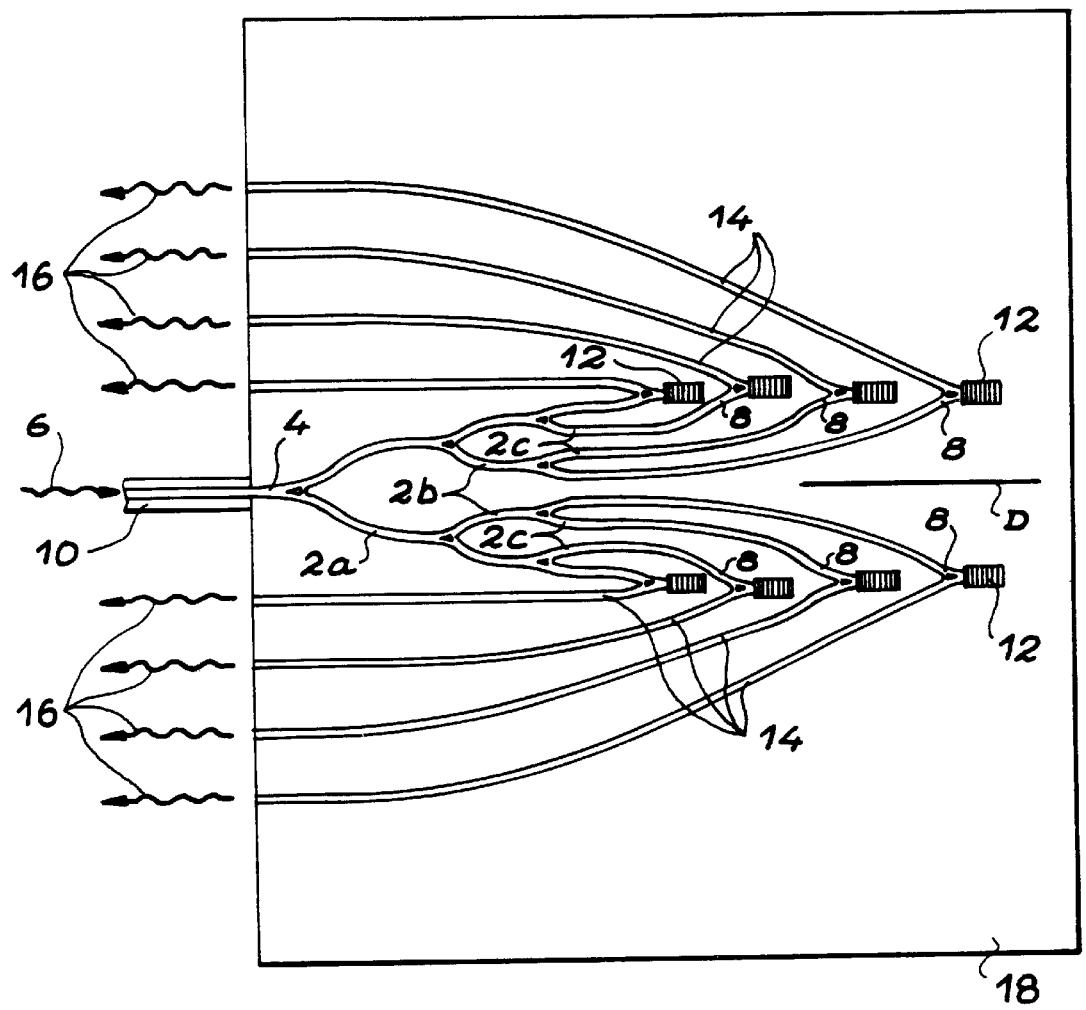
FIG. 1 is a schematic view of a particular embodiment of the demultiplexing device of the invention.

The demultiplexing device according to the invention, shown schematically in FIG. 1, is intended for wavelength demultiplexing of a plurality of spectrum lines, for example eight spectrum lines, that constitute an optical spectrum and are capable of fluctuating respectively in given spectral regions.

The device shown in FIG. 1 comprises energy separator junctions 2a, 2b, 2c that are assembled in cascade.

All these separator junctions have an input 4 intended to receive the light 6 that contains the various spectral lines as well as a plurality of outputs 8 that are adapted to supply respectively the fractions of the optical spectrum light energy.

In the example shown light 6, which contains the various spectrum lines, is transported by a single-mode optical fiber 10 that is optically coupled to input 4 of the separator junction assembly.

Given that fiber 10 is single-mode, the separator junctions are also single-mode.

Given that eight spectrum lines are to be separated, the figure shows seven separator junctions being used that are assembled in cascade. One of these junctions is referred to as 2a, two junctions as 2b and four junctions as 2c.

Therefore, there is a total of eight outputs 8 for all the separator junctions.

Preferably, Y junctions are used as separator junctions;

A Y junction is constituted by an input guide and two output guides that form an angle, typically of only a few degrees.

FIG. 1 shows that the input arm of junction 2a is optically coupled to optical fiber 10 and constitutes input 4 of the junction assembly.

The two output arms of junction 2a are respectively coupled with the input arms of the two junctions 2b.

Each output arm of these junctions 2b is in turn coupled with the input arm of one of the four junctions 2c.

The eight output arms of these junctions 2c constitute the outputs 8 of the junction assembly and are respectively coupled with eight Bragg gratings 12.

Each of these Bragg gratings 12 constitutes a wavelength selective light reflector.

This light reflector has a wavelength bandpass that contains the spectral region in which one of the eight spectrum lines is capable of fluctuating.

Therefore, this Bragg grating only reflects this line.

Each of the Bragg gratings 12 is not only coupled 2 with one of the outputs of the junction assembly 2a, 2b, 2c on one side, but is also coupled on the same side with an optical waveguide 14 that is intended to propagate light 16 which is in fact the ray reflected by the Bragg grating.

FIG. 1 also shows junctions 2a, 2b, 2c and Bragg gratings 12 to be integrated in the same flat substrate 18.

This substrate 18 is made of glass or silicon to facilitate the manufacture of the Y junctions and the Bragg gratings.

The vertical and horizontal scales in FIG. 1 may be seen to be different.

As a non-limitative example, the Bragg gratings 12 extend along the same direction D and the measurement in FIG. 1 along this direction is of the order of 70 millimeters whereas the measurement is of the order of 5 millimeters along a direction perpendicular to that of the preceding direction.

Half of the light energy that arrives at each Y junction via the input arm of said junction is in one of the output arms and the remaining half is in the other output arm.

On the other hand, only half of the light energy that appears in one of the arms of the Y junction is transmitted to the input arm of the next junction.

The remaining energy is transmitted to substrate 18.

Document (20) may be referred to for further information about this subject.

For the eight output channel demultiplexer shown in FIG. 1 the percentage of incident ray energy 6, present in each optical waveguide 14 after being reflected by the matching demultiplexing Bragg grating 12, is of the order of 3% of this incident energy, the attenuation therefore being of the order of −15 dB.

Figure 2:
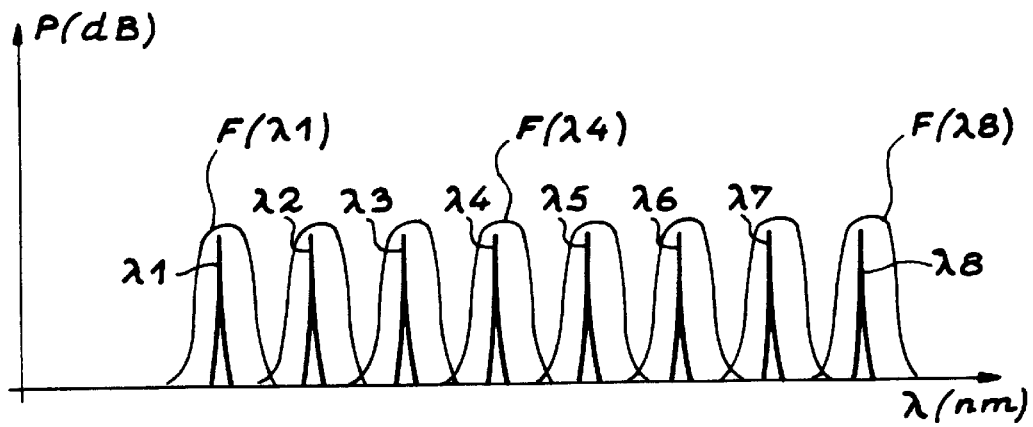
FIG. 2 is a schematic drawing that shows the principle of spectral demultiplexing using this grating.

FIG. 2 is a schematic drawing of the operating principle of the wavelength demultiplexing device in FIG. 1.

The light 6 that is to be analyzed (see FIG. 1) contains the eight spectrum lines, the wavelengths of which are respectively numbered from $\lambda 1$ to $\lambda 8$ in FIG. 2.

The spectral width of each of these lines is, for example, of the order of 0.1 nanometer.

In FIG. 2 the wavelengths $\lambda$ are shown on the abscissa and expressed in nanometers, whereas the light energies p are given on the ordinate and expressed in dB.

The light to be demultiplexed is firstly equally separated, in terms of light energy, by the Y junction assembly.

Document (13) may be referred to for further information about this subject.

All the outputs of the Y junction assembly end in a Bragg demultiplexing grating that is used as a wide band reflector.

FIG. 2 shows the functions of the respective spectral transfers $F(\lambda_i)$ of the eight Bragg gratings (i=1 to 8), each one containing the spectral region development of an optical spectrum line of incident ray energy 6.

For example, the spectral width (at −3 dB) is of the order of 3 nm.

The intersection of regions defined by two adjacent spectral transfer functions is very reduced.

The Bragg gratings can be photo-induced or photo-etched.

If a photo-etching or photo-writing technique is used the gratings can be chirped gratings.

Chirped gratings can be considered as a group of adjacent wavelength gratings that are installed in series.

If a photo-writing technique is used the gratings can be photo-induced under very strong flux in order to saturate the spectral response.

After reflective selection by the demultiplexing gratings, each demultiplexed line is sent towards a device that depends on the use intended for the demultiplexing device.

The manufacture of a device on a glass substrate, of the type shown in FIG. 1, will now be considered.

The technique used for integration on this type of substrate is well adapted for producing the device.

The technique used is that of thermal ion exchange of $Na^+$, $K^+$ or $Cs^+$ or similar ions, possibly assisted by an electric field.

The principle of this technique consists in exchanging alkaline ions, for example sodium $Na^+$ ions, that are already in the glass with other ions, $Ag^{3o}$ or $Tl^+$ or similar ions, that cause the refraction coefficient of the glass to become locally increased.

This technique is well known and documents (13) and (14) may be consulted for further information about this subject.

Optical losses due to the fiber/guide connection and attenuation of the guide have been considerably reduced using the technique of embedded guides.

This technique consists in distributing a first dopant in the substrate under an electric field.

Guides are obtained, using this technique, that are characterized by virtually circular cross-sections of doping and by a mode that is identical to that of a single-mode fiber with optimized modal covering. The guides have also greatly reduced attenuation per unit length due to the fact that surface diffusion has been eliminated.

The attenuation is generally lower than 0.1 dB/cm.

The manufacture of a device on a silicon substrate, of the type shown in FIG. 1, will now be considered.

$SiO_2$ on Si technologies ($SiO_2$, SiON and $Si_3N_4$ guiding layers) are also perfectly adapted for producing this type of device.

The techniques used in silicon substrates are based on a deposit in the vapor phase (essentially a chemical deposit in the vapor phase) or a deposit made using flamed hydrolysis and reactive ionic etching to create the patterns.

Documents (15) and (16) may be consulted for further information about deposits in the vapor phase.

Documents (17) may be consulted for further information about flamed hydrolysis.

The technique for producing silica guides on silicon will now be considered.

Document (15) may be consulted for further information about this subject.

In this technique the optical substrate is a silica layer that is sufficiently thick to isolate the silicon light. The thickness required is: 6 µm for a 0.8 µm wavelength and 12 µm for a wavelength in the region of 1.3 µm or 1.55 µm.

The guiding layer is, for example, a layer of silica doped with phosphorus, the thickness of which is of the order of between 2 µm and 5 µm according to the wavelength. The covering layer, or superstrate, is equivalent to the substrate in terms of the optical coefficient and is approximately 6 µm to 10 µm thick.

A major advantage of silicon-based integrated optics is being able to etch U- or V-shaped grooves simultaneously that can be used to position single mode optical fibers.

Documents (15), (18) and (19) may be consulted for further information about this subject.

Another advantage of silicon-based integrated optics is being able to control the slopes of the etching flanks at the end of the optical guides in order to limit unwanted reflections, that cause cross talk.

Bragg demultiplexing gratings will now be considered.

As seen above, these gratings can be photo-induced or photo-etched.

Chirped photo-induced gratings are described in documents (26) and (27).

Figure 3:
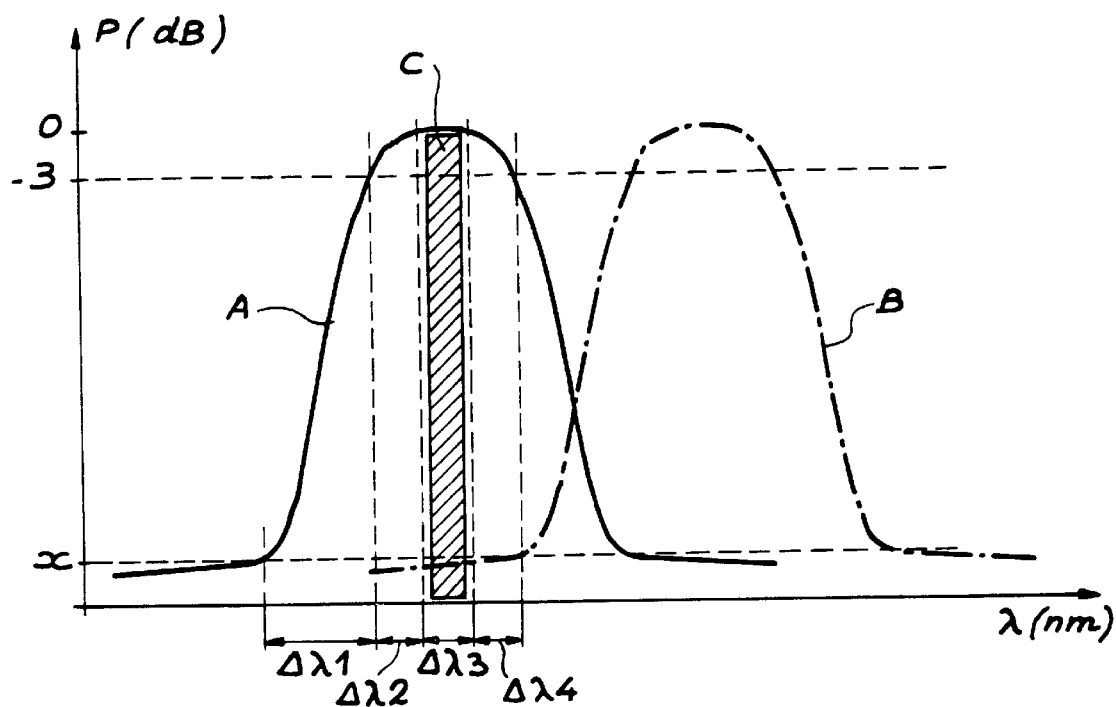
FIG. 3 shows an abacus-type of spectral demultiplexing, and FIGS. 4 and 5 a schematic drawings showing two demultiplexing possibilities.

FIG. 3 will now be considered that shows the function of transfer A of the Bragg grating of the line under consideration and the transfer function B of a Bragg grating that is adjacent to the previous grating.

The wavelengths λ expressed in this chart are given on the abscissa and expressed in nanometers and the light energies P are given on the ordinate and expressed in dB.

The spectral development zone C of the line considered is also shown. As an example, the light is equivalent to approximately 1 nm.

In FIG. 3 the cross talk x is of the order of −30 dB to −40 dB and the wavelength spacings Δλ1, Δλ2, Δλ3, Δλ4 are equivalent to 3 nm, 1 nm, 1 nm and 1 nm respectively.

A demultiplexing spectral width of approximately 3 nanometers has been chosen for each of the lines, taking into account a margin of production accuracy when photo-writing is used, as well as a thermal drift of ±50° C. around the outside temperature.

The useable spectrum space is then approximately 50%.

The cross talk depends on the suitability of the ends of the optical guides where the Bragg gratings are constituted.

Typically, when silicon-based technology is used, a −40 dB cross talk can be reached by providing each guide bearing with a Bragg grating with a slanted end relative to the grating axis. This enables the light that is not selectively reflected by the gratings to pass through the substrate on which the gratings are constituted.

For technology using glass, micro-holes can be machined along an axis that is non-perpendicular to the guide in order for light that is not selectively reflected to pass through the substrate.

Two techniques can be used to create demultiplexing Bragg gratings on the flat substrate:

The first technique consists of photo-etching that is described in document (21).

This technique takes advantage of the variation in the effective index that is induced along the guide by very close mechanical etching of the superstrate near the core, 1 µm to 2 µm deep.

A very thin layer of photoresist, approximately 70 nm thick, is applied to the substrate, for example using spin coating, in order to obtain good etching definition.

This layer of photoresist is then insolated in the visible or near ultraviolet region, for example using a 457.9 nm argon laser as described in document (21), with interferential patterns from optical assemblies similar to those used for photo-induced Bragg gratings.

Documents (22) to (28) may be consulted for further information about this subject.

Once the glass is developed it is etched by reactive ionic etching, for example using an argon beam in a trifluoromethane atmosphere.

In order to increase the effectiveness of diffraction of the grating by concentrating the field of the fundamental mode on the etched zone, an 80 nm layer of alumina, and with an optical coefficient that is higher than that for silica, is generally deposited above the etched zone.

The second technique consists of photo-writing.

Documents (22) to (28) may be consulted for further information about this subject.

If silica is doped with germanium the glass production procedure includes an annealing stage that eliminates any structural defects and results in the glass having considerably reduced photosensitivity.

The hydrogenation technique, involving the glass being annealed in a hydrogen atmosphere or being pressurized by several Mpa at ambient temperature, or flame-hardening considerably increases the photosensitivity of glass or silica on silicon substrates.

Documents (22), (23) and (24) may be consulted for further information about this subject.

The preferred technique for photo-cutting Bragg gratings is that using a phase mask as it is suitable for multiple cutting operations on a substrate using standard photolithographic methods.

The theory of this technique is described in a number of basic works (see, for example, document (12) p.64).

To put this technique into operation, a mask is created using a plate of melted silica, for example of the type marketed by the CORNING company, reference Corning 7940, on which marks have been etched.

These marks are periodical, the periods being d=

$$\frac{\lambda_B}{N}$$

(where $\lambda_B$ represents the grating wavelength and N represents the effective index of the guided fundamental mode), the depth of these marks corresponding to that of the phase modulation of π to the insolation wavelength, as discussed in document (25).

The insolation laser beam can be emitted from an ionized argon laser that emits at 488 nm, the frequency of which has been doubled inside the laser cavity, in order to emit at 244 nm in the ultraviolet. A YAG-Nd laser can also be used, the frequency of which has been quadrupled, in order to emit at 266 nm.

An KrF or similar excimer laser that emits at 249 nm can also be used.

The laser beam is then mainly diffracted according to two orders, −1 and 1, that each represent approximately 35% of the energy whereas the zero order, that should be reduced to the minimum in practice, represents less than 5% of the energy.

The two coherent waves that result from each order create an interference pattern of period Λ that produces the wavelength grating $\lambda_B = 2.N.\Lambda = N.d$ where N is the effective index of the guided fundamental mode.

The grating period is independent of the insolation wavelength. This means that the method can be used with optical sources with short coherent distances, such as a KrF excimer laser.

Chirped gratings are advantageously achieved using a series of several gratings with constant pitch phase.

Document (26) may be consulted for further information about this subject.

This type of phase mask is marketed, for example by the Lasiris, Northern Photonics and QPS Tech. Companies, to create a single grating.

The insolation mask of the component is thus composed of several of these masks divided over the guides to be insolated.

The mask is positioned on the component and the assembly, consisting of the mask and the component, is displaced in a translation movement under the laser beam by micro-displacement means, such as a pulse motor.

The typical length of a chirped grating is approximately between 5 nm and 10 nm.

Greater adjustment flexibility of the wavelength can be achieved by applying the interferometry method described in documents (27) and (28) to two of the waves.

According to this alternative method, the beam can be emitted from a dye laser, the frequency of which is doubled and pumped by an XeCl or similar excimer laser.

Document (28) may be consulted for further information about this subject.

This other method has the advantage of being able to adjust the Bragg matched wavelengths without the interferometer being modified. In order to achieve this, the insolation wavelength is very slightly adjusted between approximately 230 nm and 255 nm.

Figure 4:
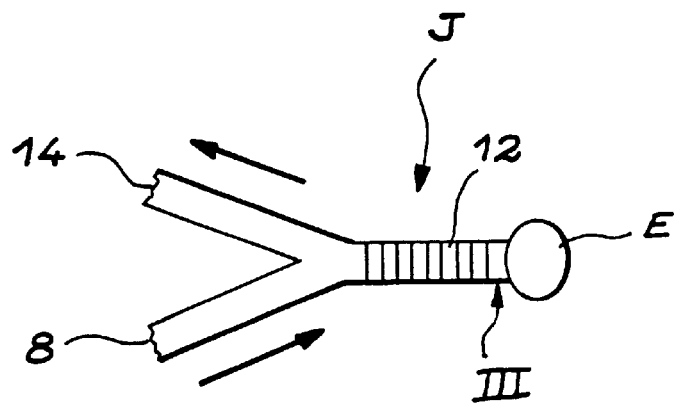

FIG. 1 will now be considered again. Light 6, that is emitted, for example, by the sensors on a measurement line, and transported by optical fiber 10, passes through an energy separator that provides, for example, 8 signals with the same spectral characteristics at each output. Each output is connected to the arm of a wavelength separator junction that operates using reflection and sends the filtered energy 16 in a guide 14. A Bragg grating 12 is photo-induced on each of these junctions. The Bragg gratings separate a wavelength region that is disconnected from the others (see FIG. 3) and ensure the spectral demultiplexing function for each of the sensors on the measurement line. There are two ways of creating this separator junction:

The first solution uses a Y junction with a Bragg grating 12, advantageously with 100% reflection, that is photo-induced on the input arm (see FIG. 4 where the junction is referred to as 'J'). This solution is advantageous in that the guiding properties of the Y junctions have reduced sensitivity to the polarization and to the wavelength of the light. Therefore, only a single mask is required to create the component. This makes production very flexible as only the Bragg grating wavelengths are adjusted to create the demultiplexer. On the other hand, this Y junction causes a 6 dB optical loss during the filtering operation, i.e. output signal 8 towards guide b 14.

Figure 5:
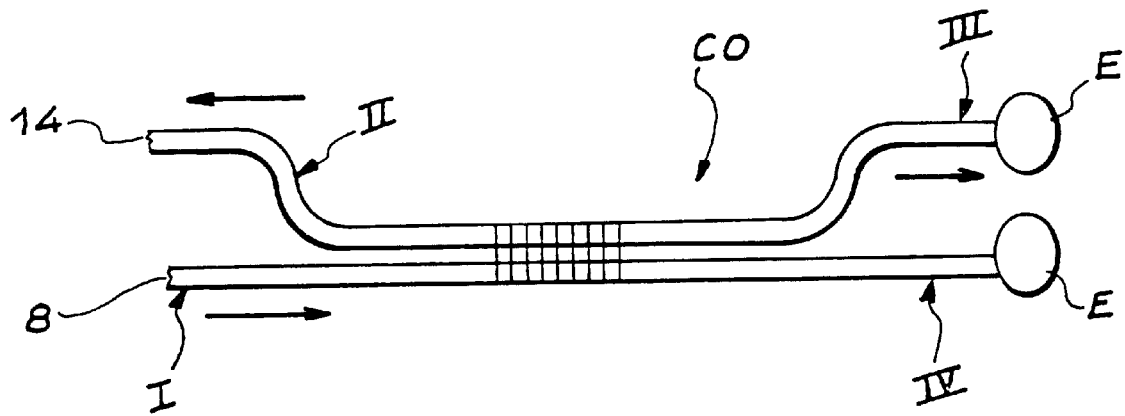

A second solution overcomes this drawback. This solution consists in simultaneously photo-writing each Bragg grating 12, advantageously with 100% reflection, on the two arms of a CO coupler in order to constitute a grating-assisted coupler (see FIG. 5). This type of coupler is advantageously chosen in order to have reduced coupling constant C such that a single beat is observed on the coupling length Lc, i.e. $C.L_c = \pi/2$, in order to minimize dependence on wavelength and polarization. Therefore, the principle of a grating-assisted coupler is as follows: The coupling length, the coupling interval and the characteristics of the coupling guides are chosen in order to obtain total energytransfer from port I to coupled port III, i.e. 100%. Using a photo-induced grating, that operates by reflection, on both arms the wavelengths reflected by the Bragg grating pass through the coupler backwards and are reflected to port II as though they came from port IV that is symmetrical to port II. The signals, the wavelengths of which are the same as the characteristic wavelength of the photo-induced Bragg grating, are then extracted. This behavior is described, for example, in document (30).

In both the Y junction and the 100% Bragg-grating-assisted coupler the ends of guide III (FIG. 4) and III and IV (FIG. 5) are pierced at a slant (shown as ovals E in FIGS. 4 and 5) in order to eliminate Fresnel reflections that cause cross talk.

The following documents are referred to in the present description:

(1) W. W. Morey, UNITED TECHNOLOGY CORPORATION (USA) Distributed multiplexed optical fiber Bragg grating sensor arrangement—see also U.S. Pat. No. —A—4,996,419

(2) D. R. Lyons and S. M. Reich, GRUMMAN AEROSPACE CORPORATION (USA) Optical electronic multiplexing reflection sensor system—see also U.S. Pat. No. —A—5,191,458

(3). P. Ferdinand et al, Mine Operating Accurate STABILITY Control with Optical fiber sensing and Bragg grating technology: the BRZTE-EURAM STABILOS Project, OFS'94, Oct. 11 –13, 1994, Glasgow—see also J. Lightwave Technol., vol.13, No.7, 1995, pp. 1303–1313 (4) J. R. Dunphy and K. P. Falkowich, UNITED TECHNOLOGY CORPORATION (USA) Multiplexed Bragg grating sensors—see also U.S. Pat. No. —A—5,426,297 (5) P. C. Clemens, G. Heise, R. Marz, H. Michel, A. Reichelt and H. W. Schneider, 8-Channel optical demutiplexer realized as SiO2/Si flat-field spectrograph, IEEE Phot. Tech. Lett., vol.6, No.9, 1994, pp.1109–1111

(6) G. Grand, G. Palumbo, A. Fournier and P. Labeye, Réseau blazé á profil très vertical en silice sur silicium.—Application au multiplexage pour communications optiques (Silica on silicon blazed grating with very vertical profile.—Uses for multiplexing applications in optical communications), Journées Nationales d'Optique Guidée, Besancon, 1994, pp. 4–6.

(7) P. Gidon, J. P. Jadot et S. Valette, Multiplexeur—démultiplexeur utilisant un réseau concave elliptique et réalisé en optique intégree (Multi/demultiplexer using an elliptical concave grating and created in integrated optics) EP-A-0275795 see also U.S. Pat. No. 4,786,133

(8) B. H. Verbeek, C. H. Henry, N. A. Olsson, N.A. Orlovsky, R. F. Kazarinov and B. H. Johnson, Integrated four-channel Mach-Zehnder Multi/demultiplexer fabricated with phosphorous doped SiO2 waveguides on Si, J. Of Lightwave Technol., Vol.6, No. 6, 1966, pp.10111015

(9) H. Takahashi, K. Oda, H. Toba and V. Inoue, Transmission characteristics of arrayed waveguide N×N wavelength multiplexer, J. Of Lightwave Technol., vol.13, No.3, 1995, pp.447–455

(10) K. Okarnoto, K. Moriwaki and S. Suzuki, Fabrication of 64×64 arrayed-waveguide grating multiplexer on silicon, Electron. Lett., vol.31, No.3, 1995, pp.184–186

(11) V. Delisle, G. Grand, A. Fournier and P. Mottier, Reduced-size low-crosstalk PECVO silica PHASAR using widened continuous bands, 8th European conference on integrated optics, ECIO'97, Stockholm, 1997

(12) J.W. Goodman, Introduction to Fourier Optics, McGraw-Hill

(13) S. Honkanen, Ion-exchanged glass waveguide devices for optical communications, Glass integrated optics and optical fiber devices, S. Iraj Nalafi Ed., SPIE vol. CR53, 1994, pp. 159–179

(14) L. Roβ, Integrated optical components in substrate glasses, Glastech. Ber., vol.62, 1969, pp.285–297

(15) S. Valette et al., Si-based integrated Optics Technologies, Solid State Tech., 1989, pp. 69–74

(16) S. Valette, S. Renard, J. P. Jadot, P. Gidon and C. Erbeia, Silicon-based Integrated Optics Technology for Optical Sensor Applications, Sensors and Act. A, 1990, pp. 1087–1091

(17) Y. Ohmori, Passive and active silica waveguides on silicon, Proc. ECOC 93, Montreux, pp.19–26

(18) W. Hunziker et al., Self-aligned flip-chip OEIC packaging technologies, Proc. ECOC 93, Montreux, pp. 84–91

(19) G. Grand et al., New method for low-cost and efficient optical connection between single-mode fibres and silica guides, Electron. Lett., Vol.27, No.1, 1991, pp.16–17

(20) M. Xzutsu, Y. Nakai and T. Sueta, Operation mechanism of the single-mode optical waveguide Y junction, Opt. Lett. Vol.7, No.3, 1982, pp.136–138

(21) C.J. Rowe, I. Bennion and D. C. J. Reid, High-Reflectivity surface-relief gratings in single-mode optical fibres, IEE Proc. J., Vol.134, No.3, 1987, pp.197–202

(22) B. J. Ainslie, G. D. Maxwell and D. L. Williams, Photosensitive glass integrated optical devices, Glass integrated optics and optical fiber devices, S. Iraj Najafi ed., SPIE vol. CR53, 1994, pp. 235–249

(23) G. D. Maxwell, R. Kashyap and B. J. Ainslie, UV written 1.5 $\mu$m reflection filters in single mode planar silica guides, Electron. Lett., Vol.291 No. 22, 1992, p. 2107–2108

(24) K. O. Hill, F. Bilodeaul B. Malo, J. Albert, D. C. Johnson, Y. Hibino, M. Abe and M. Kawachi, Photosensitivity of optical fibre and silica on silica/silicon waveguides, Opt. Lett.1 vol.16, No. 2, 1993, pp.953–955

(25) K. O. Hill, B. Maib, F. Bilodeau, D. C. Johnson and J. Albert, Bragg gratings fabricated in monomode photosensitive optical fiber by UV exposure through a phase mask, Appl. Phys. Lett., vol.62, No. 10, 1993, pp. 1035–1037

(26) K. Kashyap, P. F. McKee, R. J. Campbell and D. L. Williams, novel method of producing all fibre photo-induced chirped gratings, Electron. Lett., vol.30, No. 12, 1994, pp.996–997

(27) M. C. Farries, K. Sugden, D. C. J. Reid, I. Bennion, A. Molony and M. J. Goodwin, Very broad reflection bandwidth (44 nm) chirped fibre gratings and narrow bandpass filters produced by the use of an amplitude mask, Electron Lett., Vol.30, No. 11, 1994, pp.891–892

(28) G. Meltz, W. W. Morey and W. H. Glenn, Formation of Bragg gratings in optical fibers by a transverse holographic method, Opt. Lett., vol.14, No. 15, 1989, pp.823–825

(29) Ft. Kashyap, G. D. Maxwell and B. J. Ainslie, Laser trimmed four-port bandpass filter fabricated in single-mode photosensitive Ge-doped planar waveguide, IEEE Photon. Technol. Lett., vol.5, 1993, pp. 191–194

(30) Ingolf Baumann et al., Compact all-fiber add-drop multiplexer using fiber Bragg gratings, IEEE Phot. Tech. Lett., vol.8, No. 10, 1996, pp.1331–1333.

What is claimed is:

1. Wavelength demultiplexing device of a plurality N of spectrum lines ($\lambda 1$ to $\lambda_N$) that together constitute an optical spectrum (6) and that are each capable of fluctuating in a determined spectral region comprising:

an energy separator (2a, 2b, 2c) having an input (4) that is designed to receive the optical spectrum (6) and a plurality N of outputs (8) that are each adapted to provide a respective fraction of the optical spectrum light energy, and a plurality N of optical wavelength filters (12) each of which is connected to a particular output of the energy separator and has a wavelength bandpass that contains the spectral region associated with one of these lines ($\lambda_i$) of the optical spectrum and that, therefore, only filters this particular ray ($\lambda_i$), each filter being designed to filter a different line, this device being characterized in that each of the optical filters (12) is constituted by a single, wavelength selective light reflector that is adapted to reflect a single line ($\lambda_i$) of the optical spectrum that is different for each selective reflector, and in that each of these selective reflectors (12) is associated with means (14) to direct the line thus reflected line ($\lambda_i$) in a different direction to that taken by the incident line on the selective reflector.

2. Device of claim 1 wherein the energy separator is an assembly of separator junctions (2a, 2b, 2c) assembled in cascade.

3. Device of claim 2 wherein each separator junctions (2a, 2b, 2c) is single-mode.

4. Device of claims 2 or 3 wherein the separator junctions are couplers.

5. Device of claims 2 or 3 wherein the separator junctions are Y junctions.

6. Device of claims 1 or 2 wherein the means (14) associated with each selective reflector (12) is constituted by an optical waveguide that is designed to propagate the line ($\lambda_i$) reflected by said reflector.

7. Device of claims 1 or 2 wherein the energy separator and the reflective selectors are integrated in the same substrate (18).

8. Device of claim 7 wherein the substrate (18) is a glass or silicon substrate.

9. Device of claims 1 or 2 wherein the selective reflectors comprise Bragg gratings.

10. Device of claim 9 wherein the Bragg gratings are photo-induced or photo-etched.

11. Device of claims 9 or 10 wherein the Bragg gratings are chirped gratings.

12. Device of claims 9 or 10 wherein the Bragg gratings are fixed period gratings with maximum reflectivity and widened spectral response due to very high flux photo-writing.

\* \* \* \* \*